United States Patent
Yousef et al.

(10) Patent No.: US 7,681,214 B2
(45) Date of Patent: Mar. 16, 2010

(54) OUTER CODE COVERED SYNCHRONOUS CODE DIVISION MULTIPLE ACCESS FOR CABLE MODEM CHANNELS

(75) Inventors: Nabil R. Yousef, Foothill Ranch, CA (US); Bruce J. Currivan, Irvine, CA (US)

(73) Assignee: Broadcom Corporation, Irvine, CA (US)

( * ) Notice: Subject to any disclaimer, the term of this patent is extended or adjusted under 35 U.S.C. 154(b) by 2095 days.

(21) Appl. No.: 10/079,367

(22) Filed: Feb. 20, 2002

(65) Prior Publication Data

US 2003/0159154 A1    Aug. 21, 2003

(51) Int. Cl.
*H04N 7/167*    (2006.01)
*H04N 7/173*    (2006.01)
*H04N 7/16*     (2006.01)

(52) U.S. Cl. .............................. 725/31; 725/93; 725/94; 725/116; 725/146

(58) Field of Classification Search ................. 725/31, 725/93, 94, 116, 146
See application file for complete search history.

(56) References Cited

U.S. PATENT DOCUMENTS

| | | | | |
|---|---|---|---|---|
| 5,280,472 A * | 1/1994 | Gilhousen et al. | ............ | 370/335 |
| 5,930,244 A * | 7/1999 | Ariyoshi et al. | ............. | 370/335 |
| 6,356,555 B1 * | 3/2002 | Rakib et al. | ................. | 370/441 |
| 6,473,447 B1 * | 10/2002 | Strich et al. | ................. | 375/130 |
| 7,012,884 B2 * | 3/2006 | Horne | ........................ | 370/208 |
| 7,031,290 B2 * | 4/2006 | Ertel et al. | .................. | 370/342 |

* cited by examiner

*Primary Examiner*—Christopher Kelley
*Assistant Examiner*—Franklin S Andramuno
(74) *Attorney, Agent, or Firm*—Garlick Harrison & Markison; Shayne X. Short (57) ABSTRACT

Outer code covered synchronous code division multiple access for cable modem (CM) channels. Outer pseudo-noise (PN) code is employed, along with orthogonal codes (OCs), to spread CM signals thereby mitigating inter-code-interference (ICI) effects caused by residual multi-path propagation within CM communication systems. The added and implemented PN sequences have relatively good autocorrelation properties (when compared to the autocorrelation properties of the OCs) that mask the possible bad autocorrelation and/or cross-correlation properties of the OCs. This outer-code covered PN coding, along with the OC coding, enables much better performance in the presence of residual multi-path. The PN code's added complexity is very minimal as the PN may use the same chip rate of the orthogonal code while providing for better performance in the presence of residual multi-path components. In doing so, a relatively higher system capacity for data throughput may be realized while providing very limited added complexity to the system.

30 Claims, 9 Drawing Sheets

OUTER CODE COVERED SYNCHRONOUS CODE DIVISION MULTIPLE ACCESS FOR CABLE MODEM CHANNELS

BACKGROUND

1. Technical Field

The invention relates generally to cable modem communications; and, more particularly, it relates to cable modem systems that provide network services to a number of cable modem users.

2. Related Art

Cable modem (CM) communication systems have been under continual development for the last several years. There has been development to try to provide for improvements in the manner in which communications between the CM users and a cable modem termination system (CMTS) is performed. Many of these prior art approaches seek to perform and provide broadband network access to a number of CM users.

CM communication systems are realized when a cable company offers network access, typically Internet, access over the cable. This way, the Internet information can use the same cables because the CM communication system puts downstream data, sent from the Internet to an individual computer having CM functionality, into a communication channel having a 6 MHz capacity. The reverse transmission is typically referred to as upstream data, information sent from an individual back to the Internet, and this typically requires even less of the cable's bandwidth. Some estimates say only 2 MHz are required for the upstream data transmission, since the assumption is that most people download far more information than they upload.

Putting both upstream and downstream data on the cable television system requires two types of equipment: a cable modem on the customer end and the CMTS at the cable provider's end. Between these two types of equipment, all the computer networking, security and management of Internet access over cable television is put into place. This intervening region may be referred to as a CM network segment, and a variety of problems can occur to signals sent across this CM network segment. One particular problem is the effects of multi-path. This multi-path degradation may be viewed as being an attenuated, shifted (delayed) replica of a signal that is transmitted within the cable that resides in the CM network segment. The multi-path degradation, along with other undesirable signal modifying effects, can significantly reduce the ability to maximize the full bandwidth potential of the CM communication system. This may result in slower service to CM users, which may lead these users to seek Internet access elsewhere. There is continually an ever-increasing desire to maximize the throughput of communication systems, and CM communication systems are no exception. The undesirable effects of multi-path, along with other interference generating effects within channel segments within the CM communication system, produce significantly degraded performance of the overall system.

Further limitations and disadvantages of conventional and traditional systems will become apparent to one of skill in the art through comparison of such systems with the invention as set forth in the remainder of the present application with reference to the drawings.

SUMMARY OF THE INVENTION

Various aspects of the invention can be found in a CM communication system that employs outer code covered synchronous code division multiple access (SCDMA) for CM channels. The invention mitigates inter-code-interference (ICI) effects caused by residual multi-path propagation within CM communication systems. The invention employs an outer pseudo-noise (PN) code to spread CM signals. The added and implemented PN sequences have relatively good autocorrelation properties (when compared to the autocorrelation properties of the orthogonal codes (OCs)) that mask the possible bad autocorrelation and/or cross-correlation properties of the orthogonal codes. The invention's solution enables the system to have better performance in the presence of residual multi-path. The PN code's added complexity is very minimal as the PN is able to use the same chip rate of the orthogonal code. The present invention provides for better performance in the presence of residual multi-path components. In doing so, the present invention enables a relatively higher system capacity for data throughput while providing very limited added complexity to the system.

The present invention may be employed in a variety of contexts, including those of CM signals being transmitted from a CM to a CMTS. Another embodiment includes the transmission of signals from a CMTS to one or more CMs. Various aspects of the present invention may be performed within a CMTS, within one or more CMs, or both within a CMTS and also within one or more CMs.

As one example, a CM or a CMTS uses a number of orthogonal codes to spread the number of data streams. The spread signals are summed up and then multiplied by the outer PN code. A control signal, an enable signal, is provided by the CMTS to enable the use of the outer code if and when needed. The CMTS is also able to send PN synchronization information to the CM, such that the CM spread signal is synchronized with other CM signals, when received at the CMTS.

Moreover, there are embodiments where additional efficiency may be achieved using aspects of the present invention when employed within a SCDMA system that uses a PN code for code hopping. In such embodiments, this same PN code may also be used as an outer code, an outer spreading PN code. This would also save any needed PN code synchronization operations. It is also notes that the PN code chip rate may be implemented the same as the orthogonal code chip rate; this would require only trivial added complexity to the overall CM system.

The present invention is directed to apparatus and methods of operation that are further described in the following Brief Description of the Several Views of the Drawings, the Detailed Description of the Invention, and the claims. Other features and advantages of the present invention will become apparent from the following detailed description of the invention made with reference to the accompanying drawings.

BRIEF DESCRIPTION OF THE DRAWINGS

A better understanding of the invention can be obtained when the following detailed description of various exemplary embodiments is considered in conjunction with the following drawings.

DETAILED DESCRIPTION OF THE INVENTION

The present invention is operable to implement an outer code to spread all CM signals. The present invention is able to provide for a relatively higher system capacity for data throughput while providing very limited added complexity to the system. The present invention is able to mitigate the effects of the ICI caused by residual multi-path propagation within CM communication systems. The invention employs an outer PN code to spread all of the CM signals within the CM communication system.

In order not to require any excess bandwidth or rate change, the PN code should have the same chip rate of the orthogonal codes (OCs) used within the communication system. The added and implemented PN sequences have relatively good autocorrelation properties (when compared to the autocorrelation properties of the OCs) that mask the possible bad autocorrelation and/or cross-correlation properties of the orthogonal codes. The present invention provides for a solution that enables the system to have better performance in the presence of residual multi-path. The added complexity due to the use of the outer PN code is very minimal as the PN uses the same chip rate of the orthogonal code.

The present invention may be employed in a variety of contexts, as will be described herein. One embodiment shows how the PN code spreading may be performed within the context of a CMTS. A CMTS is a component that exchanges digital signals with CMs (CMs) on a cable network. The CMTS may be located at a local office of a cable television company or at another location within a CM communication system. Another embodiment shows how the PN code spreading may be performed within the context of one or more CMs.

In SCDMA systems, several CMs transmit their signals such that these signals are received at the CMTS on the same frequency and at the same time. In order for different CM signals to be separated at the CMTS, each CM spreads its data sequence by a code sequence of wider spectrum. The CMTS receives the sum of all of the CM signals. To separate a specific CM signal at the CMTS, the CMTS de-spreads the received sequence by multiplying it with the code sequence of the desired CM.

In order to minimize the ICI, the spreading codes are chosen such that they are perfectly orthogonal when they are received in perfect synchronism. In order to guarantee the code's orthogonality, the code sequences are often chosen to have cyclic-shift properties. In order to preserve the code orthogonality at the CMTS, transmit equalizers are sometimes used by CMs to guarantee a perfect single-path overall channel seen at the CMTS. The transmit equalizer taps at a specific CM are usually set according to an estimate of the channel between the CM and CMTS, which is estimated during the ranging process.

However, due to imperfections in the channel estimation ranging process, possible channel variations, as well as the finite length and precision of the transmit equalizer, the channel between the CM and CMTS might not be perfectly equalized, which results in residual echoes in the overall channel seen at the CMTS. These residual echoes can cause considerable performance degradation. The residual channel echoes may result in shifted (or delayed) replica of every CM signal at the CMTS side. This can greatly enhance ICI as the codes lose their perfect orthogonality. Moreover, due to the cyclic-shift properties of the used orthogonal codes, a shifted replica of one code might resemble another code to a great extent. This can also enhance the ICI significantly.

Within the context of CM communication systems, these effects of residual channel echoes may significantly decrease the overall performance of the CM communication system. The ICI can decrease the overall throughput of data within the CM communication system. This competes directly in the face of the typical design thrust within high-speed data communication systems.

Figure 1:
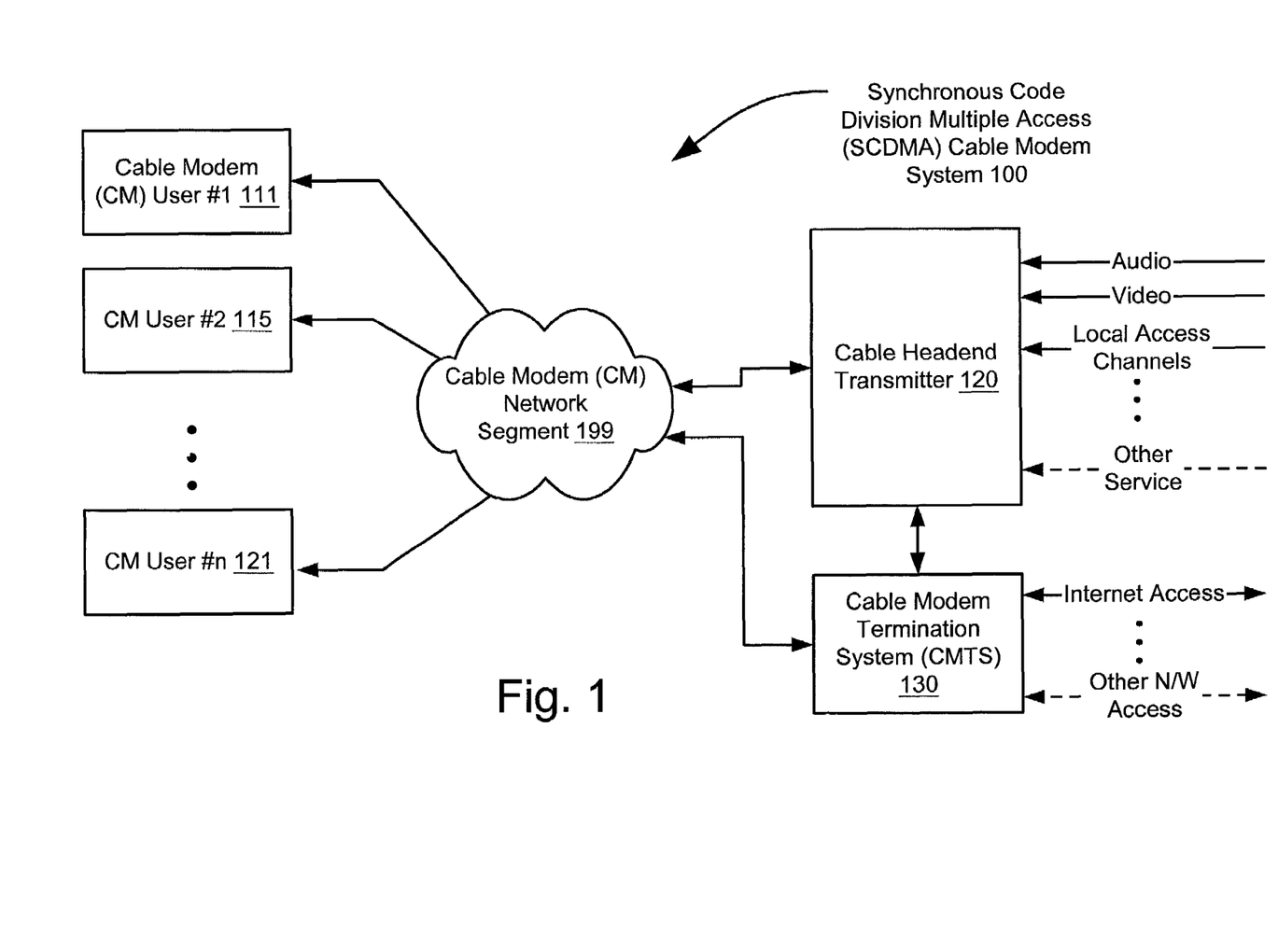
FIG. 1 is a system diagram illustrating an embodiment of a SCDMA CM system that is built in accordance with certain aspects of the present invention.

FIG. 1 is a system diagram illustrating an embodiment of a SCDMA CM system 100 that is built in accordance with certain aspects of the present invention. Each of a number of CM users, shown as a CM user #1 111, a CM user #2 112, . . . , and a CM user #n 119, is able to communicatively couple to a CM network segment 199. A number of elements may be included within the CM network segment 199, as understood by those persons having skill in the art. For example, routers, splitters, couplers, relays, and amplifiers may be contained within the CM network segment 199 without departing from the scope and spirit of the invention.

The CM network segment 199 allows communicative coupling between a CM user and a cable headend transmitter 120 and/or a CMTS 130. In some embodiments, the cable headend transmitter 120 is in fact contained within the CMTS 130. In other embodiments, the cable headend transmitter 120 is located externally to the CMTS 130. The cable headend transmitter 120 is able to provide a number of services including those of audio, video, local access channels, as well as any other service known in the art of cable systems. Each of these services may be provided to the one or more CM users 111-119.

In addition, through the CMTS 130, the CM users 111-119 are able to transmit and receive data from the Internet, . . . , and/or any other network to which the CMTS 130 is communicatively coupled. The operation of a CMTS, at the cable-provider's head-end, may be viewed as providing many of the same functions provided by a digital subscriber line access multiplexor (DSLAM) within a digital subscriber line (DSL) system. The CMTS 130 takes the traffic coming in from a group of customers on a single channel and routes it to an Internet Service Provider (ISP) for connection to the Internet, as shown via the Internet access. At the head-end, the cable providers will have, or lease space for a third-party ISP to have, servers for accounting and logging, dynamic host configuration protocol (DHCP) for assigning and administering the Internet protocol (IP) addresses of all the cable system's users, and typically control servers for a protocol called Data Over Cable Service Interface Specifications (DOCSIS), the major standard used by U.S. cable systems in providing Internet access to users.

The downstream information flows to all of the connected CM users 111-119; this may be viewed to be in a manner that is similar to that manner within an Ethernet network. The individual network connection, within the CM network segment 199, decides whether a particular block of data is intended for it or not. On the upstream side, information is sent from the CM users 111-119 to the CMTS 130; on this upstream transmission, the users within the CM users 111-119 to whom the data is not intended do not see that data at all. As an example of the capabilities proffered by a CMTS, the CMTS will enable as many as 1,000 users to connect to the Internet through a single 6 MHz channel. Since a single channel is capable of 30-40 megabits per second of total throughput, this means that users may see far better performance than is available with standard dial-up modems. Embodiments implementing the present invention are described below and in the various Figures that show the data handling and control within one or both of a CM and a CMTS within a CM system that operates by employing SCDMA.

The CMs of the CM users 111-119 and the CMTS 130 communicate synchronization information to one another to ensure proper alignment of transmission from the CM users 111-119 to the CMTS 130. This is where the synchronization of the SCDMA communication systems is extremely important. When a number of the CMs all transmit their signals at a same time such that these signals are received at the CMTS 130 on the same frequency and at the same time, they must all be able to be properly de-spread and decoded for proper signal processing. The present invention employs PN code spreading, OC spreading on a transmit side, and then PN code de-spreading, OC de-spreading on a receive side in its various embodiments.

Each of the CMs 111-119 is located a respective transmit distance from the CMTS 130. In order to achieve optimum spreading diversity and orthogonality for the CMs 111-119 to transmission of the CMTS 130, each of the CM transmissions must be synchronized so that it arrives, from the perspective of the CMTS 130, synchronous with other CM transmissions. In order to achieve this goal, for a particular transmission cycle, each of the CMs will typically transmit to the CMTS at a respective transmission time, which will likely differ from the transmission times of other CMs. These differing transmission times will be based upon the relative transmission distance between the CM and the CMTS 130. These operations may be supported by the determination of the round trip delays (RTPs) between the CMTS 130 and each supported CM. With these RTPs determined, the CMs may then determine at what point to transmit their SCDMA data so that all CM transmissions will arrive synchronously at the CMTS 130.

Figure 2:
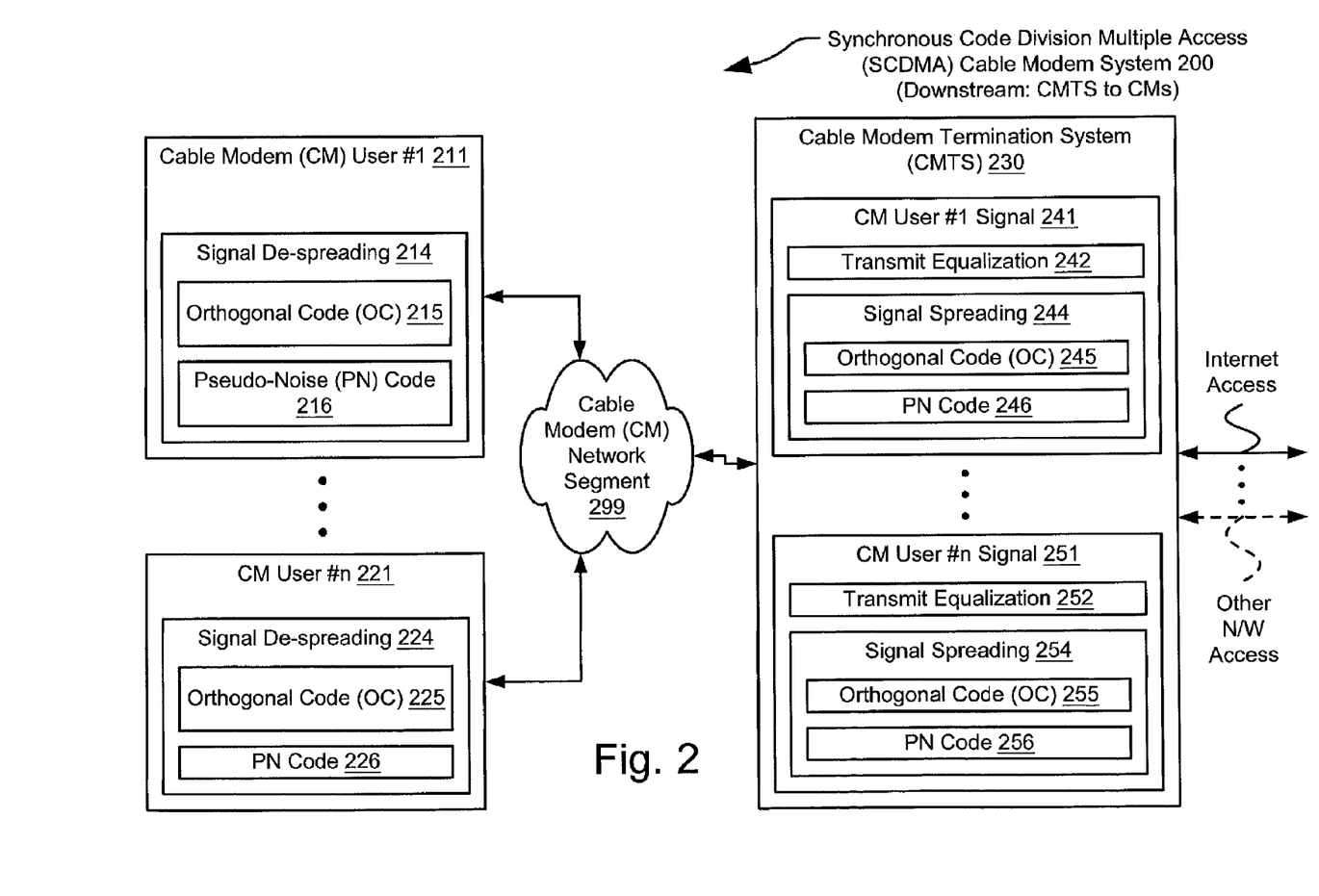
FIG. 2 is a system diagram illustrating an embodiment of a SCDMA CM system, performing downstream communication from a CMTS to a number of CMs, that is built in accordance with certain aspects of the present invention.

FIG. 2 is a system diagram illustrating an embodiment of a SCDMA CM system 200, performing downstream communication from a CMTS to a number of CMs, that is built in accordance with certain aspects of the present invention. Each of a number of CM users, shown as a CM user #1 211, . . . , and a CM user #n 219, is able to communicatively couple to a CM network segment 299. A number of elements may be included within the CM network segment 299, as understood by those persons having skill in the art. For example, routers, splitters, couplers, relays, and amplifiers may be contained within the CM network segment 299 without departing from the scope and spirit of the invention.

The CM network segment 299 allows communicative coupling between the CM users 211-221 a CMTS 230. The FIG. 2 shows the downstream communication from the CMTS 230 and the CM users 211-221 via the CM network segment 299. The CMTS 230 is able to communicate the appropriate CM signals to each of the CM users 211-221. For example, the CMTS 230 is able to communicate a CM user #1 signal 241 to the CM user #1 211 and a CM user #n signal 242 to the CM user #n 221. For each of the CM user signals, the CMTS 230 is able to perform transmit equalization to guarantee a nearly perfect single-path overall channel that is seen at the CMTS. The transmit equalizer taps at a specific CM are usually set according to an estimate of the channel between the CM and CMTS, which is estimated during the ranging process. In addition, the CMTS 230 is able to perform signal spreading of each of these CM user signals as well. This signal spreading involves employing two separate codes to do the spreading, an OC and a PN code. For example, the CMTS 230 is able to perform transmit equalization 242 for the CM user #1 signal 241. In addition, the CMTS 230 is able to perform signal spreading 244 that involves employing both an OC 245 and a PN code 246. Similarly, the CMTS 230 is able to perform transmit equalization 252 for the CM user #n signal 251. In addition, the CMTS 230 is able to perform signal spreading 254 that involves employing both an OC 255 and a PN code 256.

Then, the respective CMs are able to perform signal de-spreading of both the OCs and the PN codes of their respective received CM signals. For example, the CM of the CM user #1 211 is able to perform signal de-spreading 214 that involves employing both an OC 215 and a PN code 216. In addition, the CM of the CM user #n 221 is able to perform signal de-spreading 224 that involves employing both an OC 225 and a PN code 226.

Figure 3:
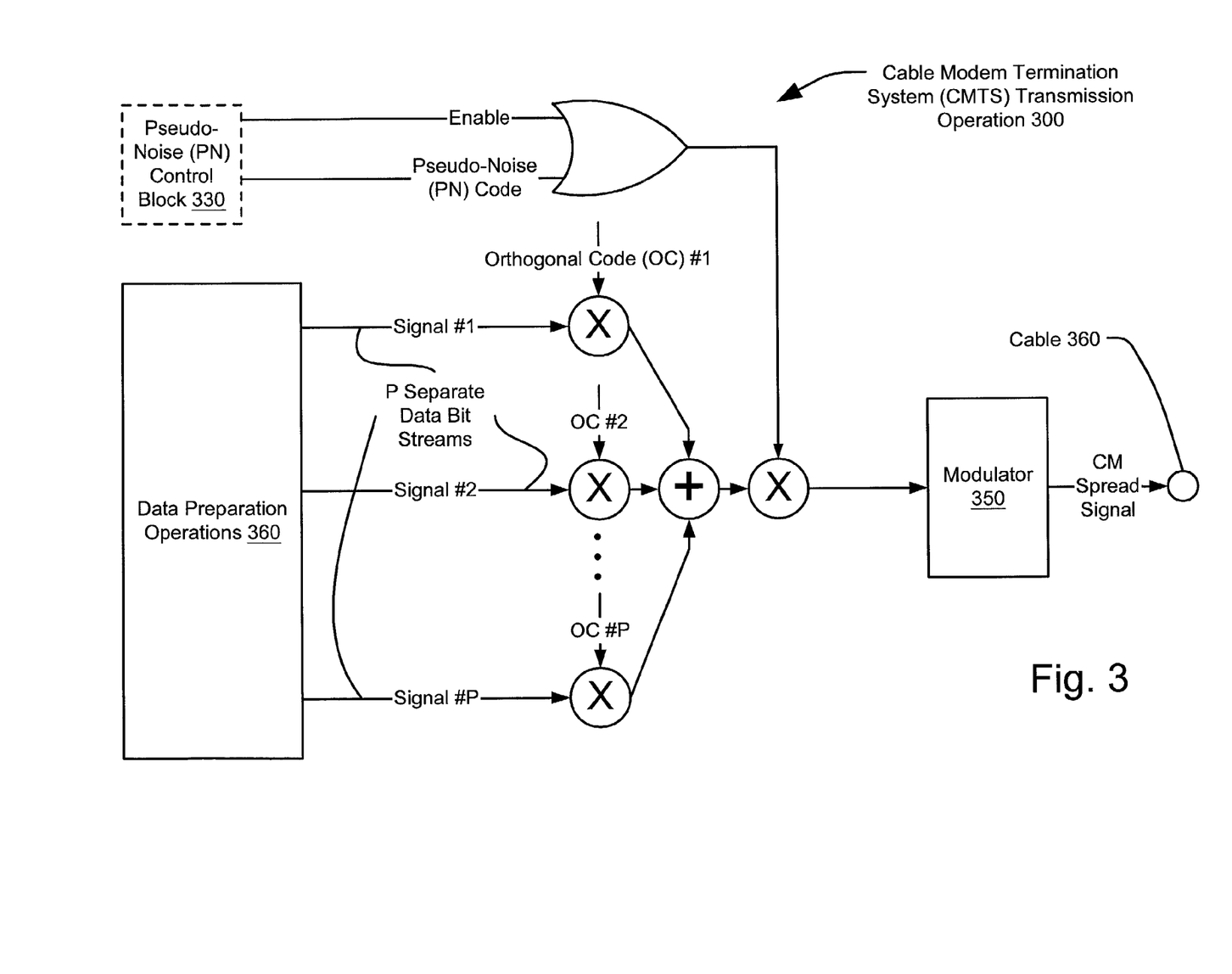
FIG. 3 is a functional block diagram illustrating an embodiment of CMTS transmission operation that is performed in accordance with certain aspects of the present invention.

FIG. 3 is a functional block diagram illustrating an embodiment of CMTS transmission operation 300 that is performed in accordance with certain aspects of the present invention. The FIG. 3 shows the proposed CM spreading scheme that is performed in accordance with the present invention. A number of data preparation operations, performed in a block 360, to prepare a number of signal streams for subsequent processing. The data preparation operations 360 include any number of operations including those operations at high level layers and also down to the physical layer (PHY) as well as media access control (MAC) operations as well.

In this scheme, the various signals are processed within a CM communication system that uses P orthogonal codes to spread P data streams (signal #1, signal #2, . . . , to signal #P). The spread signals are all summed together and then multiplied by an outer PN code. The PN code signal is provided from an OR gate signal; the OR gate receives an enable signal and the PN code as inputs from a PN control block 330.

For example, a control signal (enable) is provided by the CMTS to enable the use of the outer PN code if and when it is needed. The CMTS also send PN synchronization information to the CM to which it is communicating, such that the CM spread signal is synchronized with other CM signals, when it is received at the CMTS.

An additional efficiency may be achieved using aspects of the present invention when employed within a SCDMA system that uses a PN code for code hopping. In such embodiments, this same PN code may also be used as an outer code, an outer spreading PN code. This would also save any needed PN code synchronization operations. It is also notes that the PN code chip rate may be implemented the same as the orthogonal code chip rate; this would require only trivial added complexity to the overall CM system.

This now OC spread and PN code spread signal (the CM spread signal) is then provided to a modulator 350 for transmission of the CM spread signal via a cable 360. The cable 360 provides communicative coupling to the Internet and/or additional networks as well. A number of modulation schemes may be performed by the modulator 350, including BPSK up to 1024 QAM modulation schemes.

Figure 4:
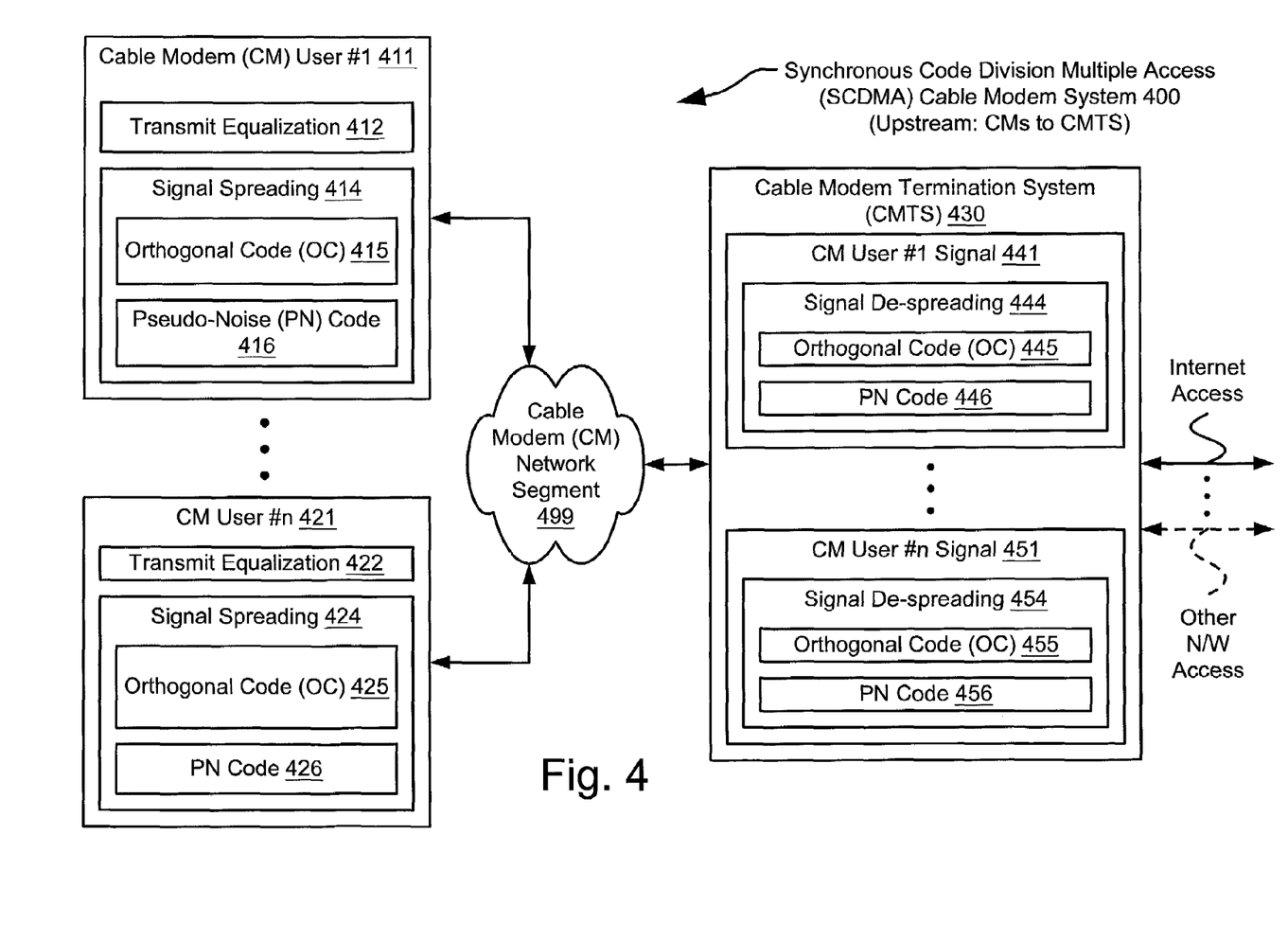
FIG. 4 is a system diagram illustrating an embodiment of a SCDMA CM system, performing upstream communication from a number of CMs to a CMTS, that is built in accordance with certain aspects of the present invention.

FIG. 4 is a system diagram illustrating an embodiment of a SCDMA CM system 400, performing upstream communication from a number of CMs to a CMTS, that is built in accordance with certain aspects of the present invention. From certain perspectives, the FIG. 4 shows the reverse transmission operation when compared to the operation performed by the SCDMA CM system 200. In this case, the upstream communication is shown within the SCDMA CM system 400.

Similar to FIG. 2, each of a number of CM users, shown as a CM user #1 411, . . . , and a CM user #n 419, is able to communicatively couple to a CM network segment 499. A number of elements may be included within the CM network segment 499, as understood by those persons having skill in the art. For example, routers, splitters, couplers, relays, and amplifiers may be contained within the CM network segment 499 without departing from the scope and spirit of the invention.

The CM network segment 499 allows communicative coupling between the CM users 411-421 a CMTS 430. The FIG. 4 shows the upstream communication from the CM users 41120 421 to the CMTS 430 via the CM network segment 499. The CMTS 430 is able to communicate the appropriate CM signals to each of the CM users 411-421. For example, the CMTS 430 is able to receive a CM user #1 signal 441 to the CM user #1 411 and a CM user #n signal 442 from the CM user #n 421. For each of the CM user signals, the respective CM is able to perform transmit equalization to guarantee a nearly perfect single-path overall channel that is seen at the CMTS. The transmit equalizer taps at a specific CM are usually set according to an estimate of the channel between the CM and CMTS, which is estimated during the ranging process.

In addition, each of the CMs is able to perform signal spreading of each of these CM user signals as well. This signal spreading involves employing two separate codes to do the spreading, an OC and a PN code. For example, the CM of the CM user #1 411 is able to perform transmit equalization 412 for the CM user #1 signal 441. The CM of the CM user #n 421 is able to perform transmit equalization 422 for the CM user #n signal 451. In addition, the CM of the CM user #1 411 is able to perform signal spreading 414 that involves employing both an OC 515 and a PN code 416. Similarly, the CM of the CM user #n 421 is able to perform signal spreading 424 that involves employing both an OC 425 and a PN code 426.

Then, the CMTS 430 is able to perform signal de-spreading of both the OCs and the PN codes of their respective received CM signals that are provided by the various CMs within the system. For example, the CMTS 430 is able to perform signal de-spreading 444 of the CM user #1 signal 441; the signal de-spreading 244 involves employing both an OC 445 and a PN code 446. In addition, the CMTS 430 is able to perform signal de-spreading 454 of the CM user #n signal 451; the signal de-spreading 454 involves employing both an OC 455 and a PN code 456.

Figure 5:
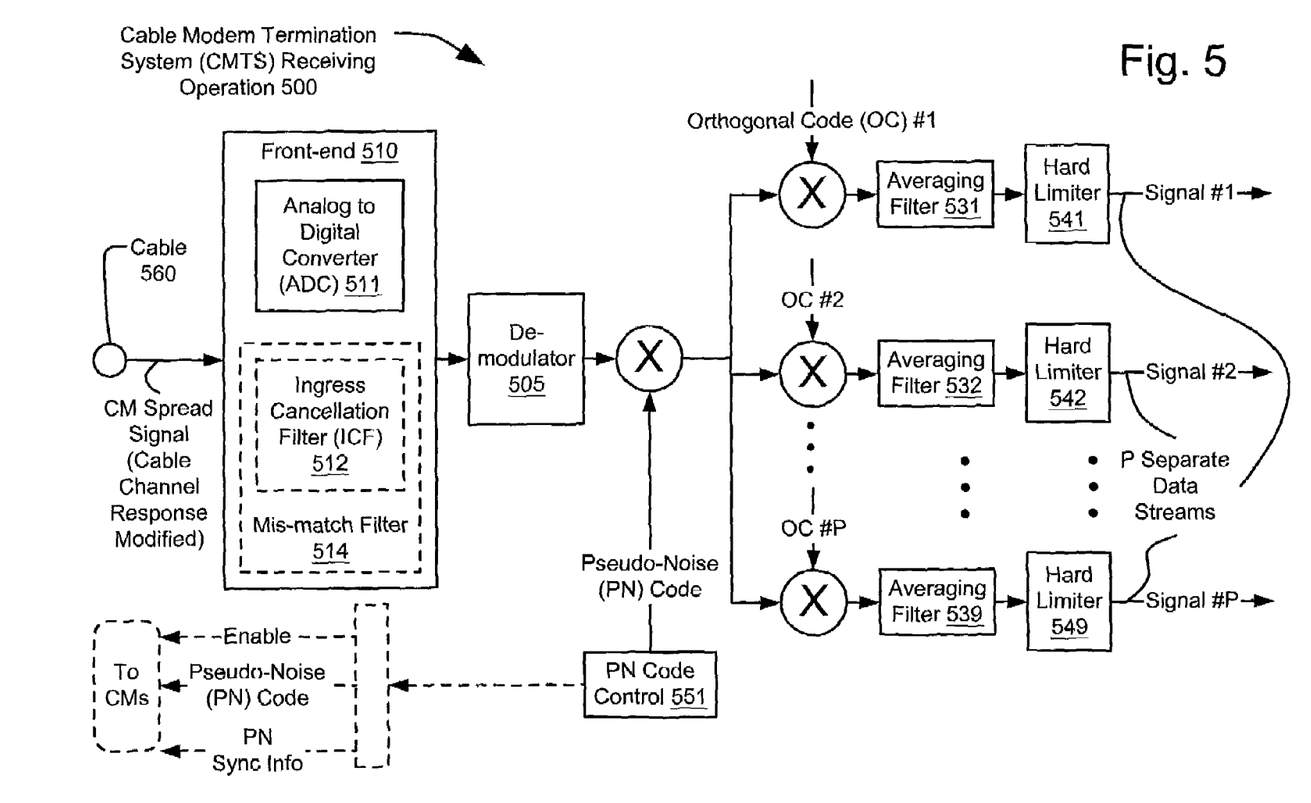
FIG. 5 is a functional block diagram illustrating an embodiment of CMTS receiving operation that is performed in accordance with certain aspects of the present invention.

FIG. 5 is a functional block diagram illustrating an embodiment of CMTS receiving operation 500 that is performed in accordance with certain aspects of the present invention. A CM spread signal is received via a cable 560. The CM spread signal is modified by the cable 560; the cable 560 has a channel response that may undesirably affect the CM spread signal that is provided at the transmitting end of the cable 560.

A front-end 510 includes an analog to digital converter (ADC) 511, and, in some embodiments, a mismatch filter 514. The use of the mismatch filter 514 is optional; the mismatch filter 514 may be viewed as being operable to perform any filtering that is desired to remove any residual inter-symbol interference (ISI), and imperfections in the front-end 510, and/or any mismatches between a transmitter and a receiver that are employed according to the present invention. In some embodiments, the mismatch filter 514 includes an ingress cancellation filter (ICF) 512. Clearly, the mismatch filter 514 may employ filters and perform filtering that is different than that of the ICF 512. The ICF 512 is operable to reduce, among other things, narrowband interference of the CM spread signal as it travels through the cable 560. The ICF 512 may be viewed as one type of filter that may be used to perform mismatch filtering.

The cable 560 may undesirably create multi-path degradation within the CM spread signal. The multi-path degradation may be viewed as being an attenuated, shifted (delayed) replica of a signal that is transmitted within the cable 560.

Afterwards, a demodulator 505 extracts the data that are carried on the CM spread signal. The CM spread signal is then de-spread using a PN; this involves the de-spreading of the outer code, namely, the PN code. A PN code control block 551, that governs the de-spreading of the CM spread signal, also provides PN synchronization information, the particular PN code, and an enable signal to the CMs from which the CM spread signal is generated and that transmit their signals to the CMTS.

Afterwards, the outer code de-spread signal is further de-spread using a number of orthogonal codes (OCs), shown as an OC #1 de-spreader, an OC #2 de-spreader, . . . , and an OC #P de-spreader. Then, within each of the signal paths lies an averaging filter and a hard limiter that are used to determine the particular information sent from the various CMs. For example, a signal sent from a CM #1 is de-spread using OC #1 de-spreader, and then the signal provided to an averaging filter 531 and to a hard limiter 541 to generate the signal #1. Similarly, a signal sent from a CM #2 is de-spread using OC #2 de-spreader, and then the signal provided to an averaging filter 532 and to a hard limiter 542 to generate the signal #2; . . . ; and a signal sent from a CM #P is de-spread using OC #P de-spreader, and then the signal provided to an averaging filter 539 and to a hard limiter 549 to generate the signal #P. Each of the signals #1, #2, . . . , and #P represent P separate data streams.

Figure 6:
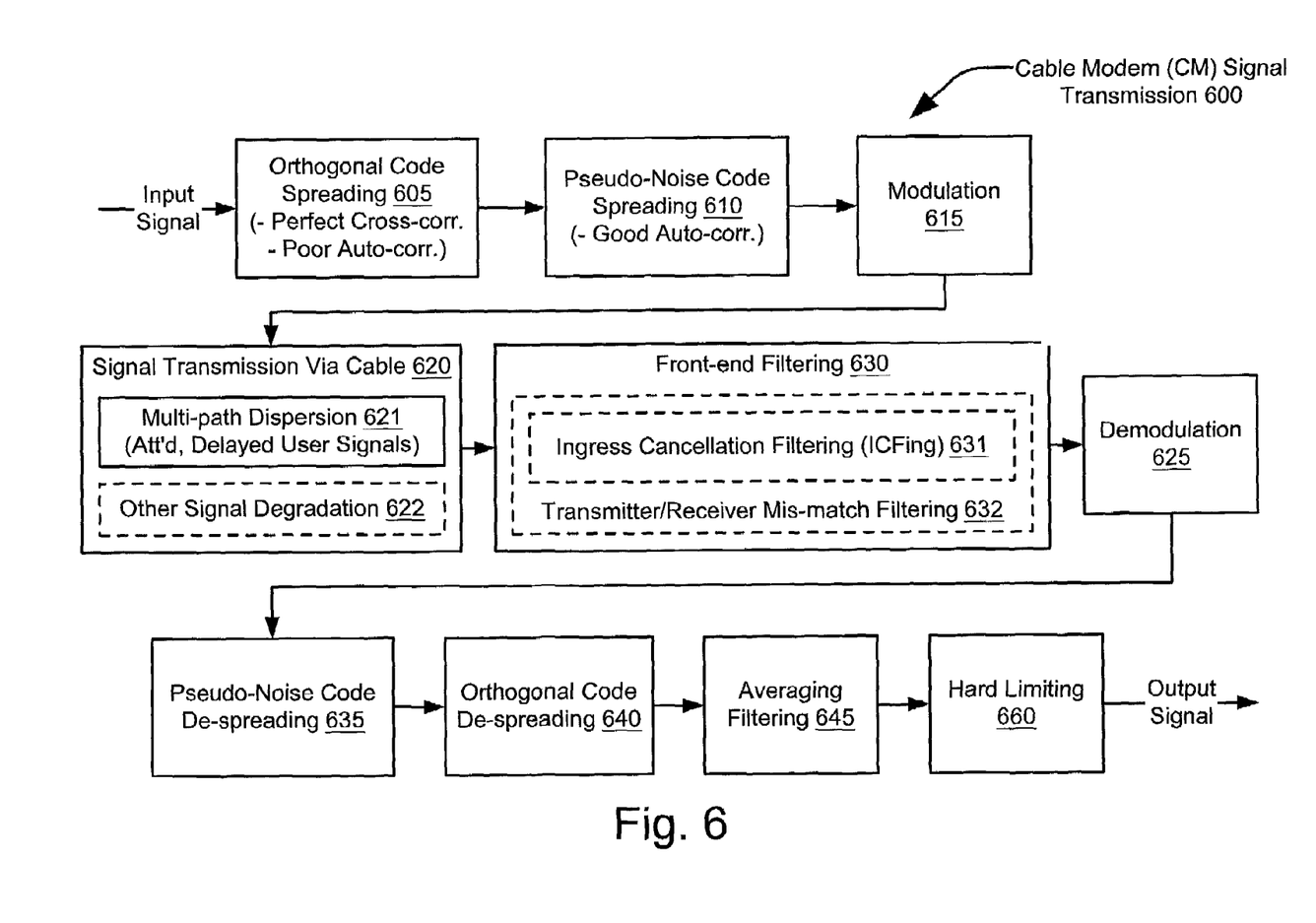
FIG. 6 is a functional block diagram illustrating an embodiment of CM signal transmission that is performed in accordance with certain aspects of the present invention.

FIG. 6 is a functional block diagram illustrating an embodiment of CM signal transmission 600 that is performed in accordance with certain aspects of the present invention. An input signal is provided to a functional block 605 that performs OC spreading 605. The OC includes a perfect cross-correlation, yet it also has relatively poor auto-correlation characteristics. Subsequently, a functional block 610 performs PN code spreading. The PN code possesses relatively good auto-correlation characteristics. The PN code spreading, from one perspective, compensates for the relatively poor auto-correlation characteristics of the OCs employed within the functional block 605. Then, a functional block 615 performs modulation of the now OC and PN code spread signal. Again, any number of modulation schemes may be employed including BPSK up to 1024 QAM modulation schemes.

Then, as shown in a functional block 620, the signal is transmitted via a cable. The signal may degrade as it is transmitted via the cable, including multi-path dispersion 621, and in other cases, it may undergo other signal degradation 622 as well. The multi-path dispersion 621 may be viewed as being attenuated, delayed versions of the signals transmitted to and from CM users within a CM communication system. After the signal has been transmitted via the cable, then a functional block 630 performs front-end filtering of the received signal. While performing the front-end filtering of the received signal within the functional block 630, transmitter/receiver mismatch filtering may be performed as shown in a functional block 632. This transmitter/receiver mismatch filtering 632 may be viewed as being any filtering that is operable to remove any residual ISI of a received signal, and to substantially eliminate and/or reduce any imperfections of the filtering performed by the front-end filtering 630, and/or reduce any mismatches between a transmitter and a receiver that are employed according to the present invention. In some embodiments, the transmitter/receiver mismatch filtering 632 is performed by using ingress cancellation filtering (ICFing) as shown in a functional block 631. The use of the transmitter/receiver mismatch filtering 632, and specifically the use of the ICFing 631, are optional. Clearly, the transmitter/receiver mismatch filtering 632 may perform filtering that is different than that of the ICFing 631. The ICFing 631 is operable to reduce, among other things, narrowband interference of the CM spread signal as it travels through the cable. The signal is then demodulated as shown in a functional block 625.

The PN code is then used for de-spreading the signal as shown in a functional block 635. Afterwards, the OC is then used for de-spreading the signal as shown in a functional block 640. If desired, then averaging filtering is shown in a functional block 645. Afterwards, hard limiting is performed as shown in a functional block 660 to generate an output signal that is, ideally, a representation of the data that have been provided earlier as the input signal.

It is noted here that the CM signal transmission 600 may be performed either during transmission of a signal from a CMTS to a CM, or alternatively, during transmission of a signal from CM to a CMTS. The present invention proves to be a system and method that is able to substantially reduce the deleterious effects of multi-path within CM communication systems. This system and method are able then to provide for significant improvement of data throughput within a CM communication system.

Figure 7:
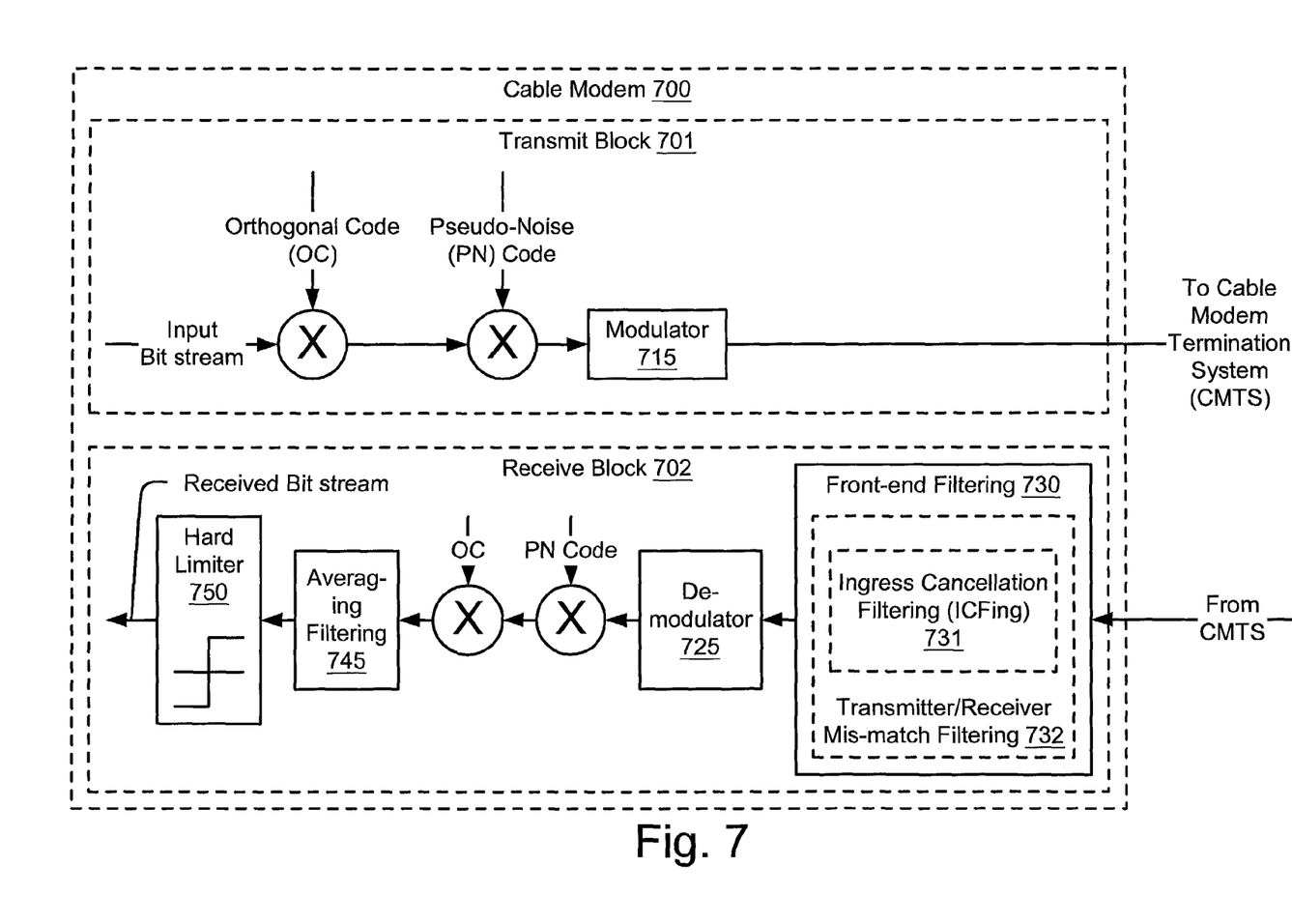
FIG. 7 is a system diagram illustrating an embodiment of a CM that is built in accordance with certain aspects of the present invention.

FIG. 7 is a system diagram illustrating an embodiment of a CM 700 that is built in accordance with certain aspects of the present invention. From certain perspectives, the FIG. 7 shows the capabilities of the CM 700 being able to perform OC spreading and PN code spreading. The cable modem 700 includes a transmit block 701 and a receive block 702. The transmit block 701 and the receive block 702 operate cooperatively to communicate with a CMTS. This communication may be via a CM network segment in certain embodiments.

Within the transmit block 701, an input bit stream is provided to an OC spreader and subsequently to a PN code spreader. The output signal, from the PN code spreader is provided to a modulator 715 for transmission to a CMTS.

Within the receive block 702, a signal received from the CMTS undergoes front-end filtering as shown in a functional block 730. The front-end filtering may include transmitter/receiver mismatch filtering as shown in a functional block 732. This transmitter/receiver mismatch filtering 732 may be viewed as being any filtering that is operable to remove any residual ISI of a received signal, and to substantially eliminate and/or reduce any imperfections of the filtering performed by the front-end filtering 730, and/or reduce any mismatches between a transmitter and a receiver that are employed according to the present invention. In some embodiments, the transmitter/receiver mismatch filtering 732 is performed by using ingress cancellation filtering (ICFing) as shown in a functional block 731. The use of the transmitter/receiver mismatch filtering 732, and specifically the use of the ICFing 731, are optional. Clearly, the transmitter/receiver mismatch filtering 732 may perform filtering that is different than that of the ICFing 731. The ICFing 731 is operable to reduce, among other things, narrowband interference of the CM spread signal as it travels through the cable.

The output from the front-end filtering functional block 730 is provided to a demodulator 725. The front-end filtering, within the functional block 730, may also include conversion of the analog signal received from the CMTS into a digital signal using an analog to digital converter (ADC). Then, the de-spreading of the signal is performed, as shown first by a PN code de-spreader and then by an OC de-spreader. The output of the OC de-spreader is provided to an averaging filter 745 and subsequently to a hard limiter 750. The output from the hard limiter is then the received bit stream, the data that have been transmitted to the CM 700 from the CMTS.

Figure 8:
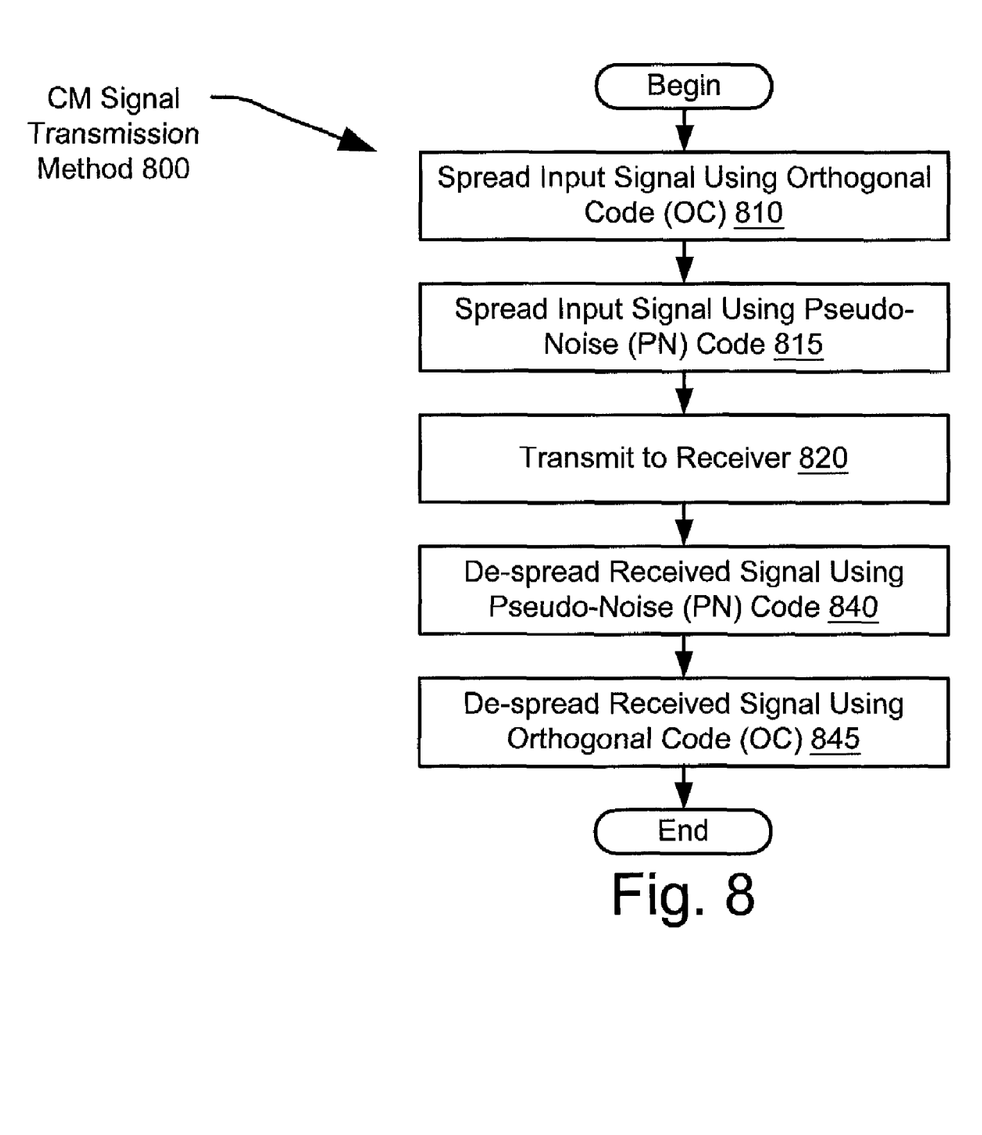
FIG. 8 is a flowchart illustrating an embodiment of a CM signal transmission method that is performed in accordance with certain aspects of the present invention.

FIG. 8 is a flowchart illustrating an embodiment of a CM signal transmission method 800 that is performed in accordance with certain aspects of the present invention. In a block 810, an input signal is spread using an OC. Then, the OC spread input signal is spread using a PN code in a block 815. The now OC spread and PN code spread signal is transmitted to a receiver. This receiver may be a CM in one embodiment, and the receiver may be a CMTS in other embodiments.

During transmission to the receiver, the signal may undergo degradation due to multi-path effects of the cable channel over which the signal has been transmitted. After receipt of the signal by the receiver, then the received signal is first de-spread using a PN code as shown in a block 840. Afterwards, the received signal is then de-spread using an OC as shown in a block 850. Again, the CM signal transmission method 800 shows an embodiment where a signal may be spread using both an OC and a PN code before transmission and then de-spread using the OC and the PN code after receipt of the signal.

Figure 9:
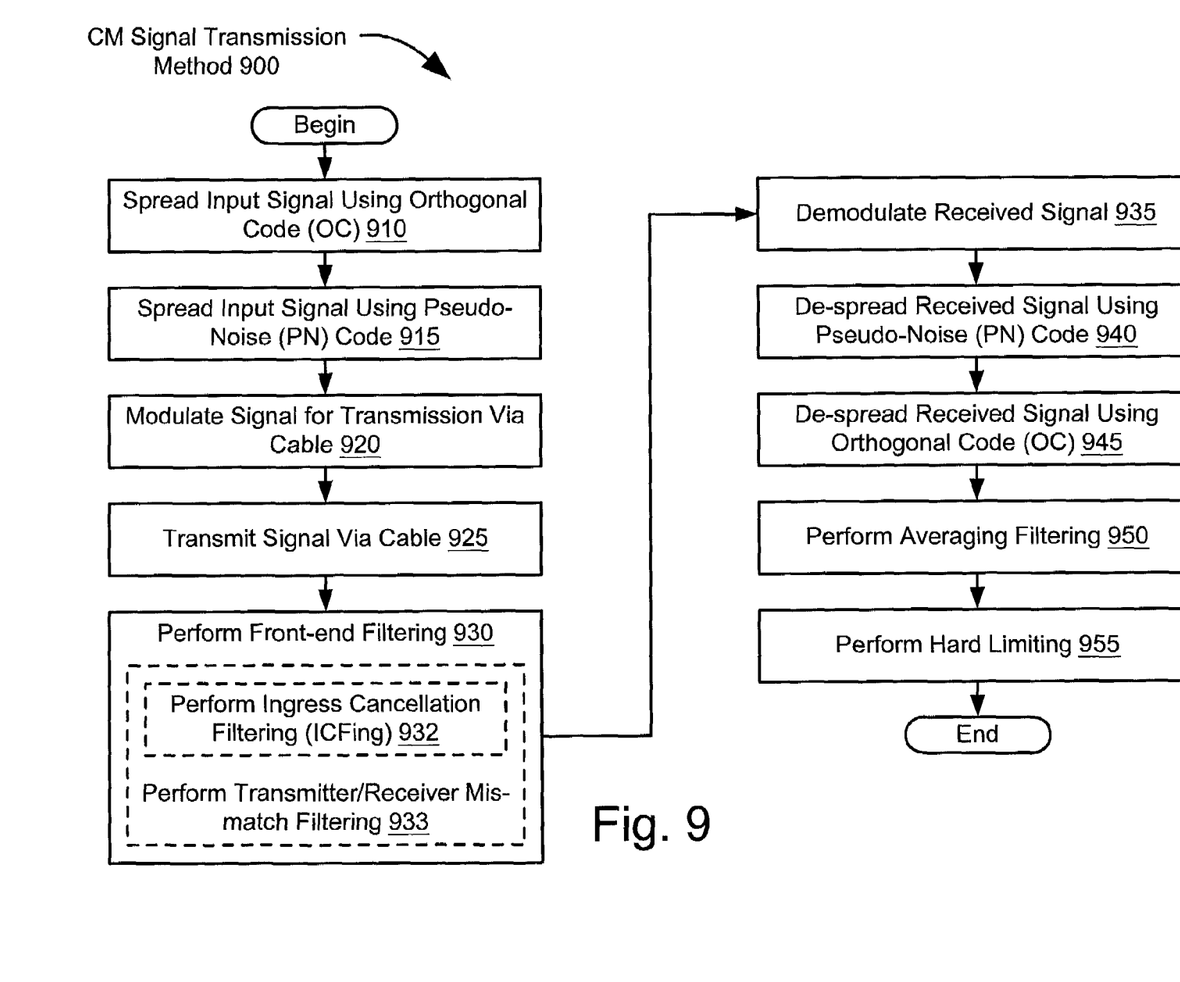
FIG. 9 is a flowchart illustrating another embodiment of a CM signal transmission method that is performed in accordance with certain aspects of the present invention.

FIG. 9 is a flowchart illustrating another embodiment of a CM signal transmission method 900 that is performed in accordance with certain aspects of the present invention. In a block 910, an input signal is spread using an OC. Then, the OC spread input signal is spread using a PN code in a block 915. The now OC spread and PN code spread signal is modulated for transmission via a cable. The now OC spread and PN code spread, modulated signal is transmitted via a cable 925. After the cable has been transmitted via the cable as shown in the block 925, and after it has been received by a receiver, then the signal undergoes front-end filtering as shown in a block 930.

This front-end filtering 930 may involve performing transmitter/receiver mismatch filtering as shown in a block 933. This transmitter/receiver mismatch filtering 933 may be viewed as being any filtering that is operable to remove any residual ISI of a received signal, and to substantially eliminate and/or reduce any imperfections of the filtering performed by the front-end filtering 930, and/or reduce any mismatches between a transmitter and a receiver that are employed according to the present invention. In some embodiments, the transmitter/receiver mismatch filtering 933 is performed by using ingress cancellation filtering (ICFing) as shown in a block 932. The performance of transmitter/receiver mismatch filtering 933, and specifically the performing the ICFing 932, are optional. Clearly, the transmitter/receiver mismatch filtering 933 may perform filtering that is different than that of the ICFing 932.

The received and now filtered signal identification demodulated as shown in a block 935. The demodulated signal is then de-spread first using a PN code as shown in a block 940. This signal is then de-spread using an OC as shown in a block 945. Averaging filtering is then performed on this now PN and OC de-spread signal as shown in a block 950. Then hard limiting is performed in a block 955.

In view of the above detailed description of the invention and associated drawings, other modifications and variations will now become apparent to those skilled in the art. It should also be apparent that such other modifications and variations may be effected without departing from the spirit and scope of the invention.

What is claimed is:

1. A cable modem system that is operable using synchronous code division multiple access for a plurality of cable modem channels, the cable modem system comprising:
   a plurality of cable modems;
   a cable modem termination system; and
   a cable modem network segment that communicatively couples the cable modem termination system to the plurality of cable modems; and wherein:
   the cable modem termination system is operable to provide network access to each cable modem within the plurality of cable modems, the network access being provided using a plurality of cable modem user signals, each cable modem user signal being transmitted from the cable modem termination system to at least one of the cable modems within the plurality of cable modems;
   the cable modem termination system spreads each of the cable modem user signals using one corresponding orthogonal code of a plurality of orthogonal codes to generate a plurality of orthogonal code spread cable modem user signals;
   the cable modem termination system sums the plurality of orthogonal code spread cable modem user signals together to generate a summed, orthogonal code spread signal;
   the cable modem termination system spreads the summed, orthogonal code spread signal using a pseudo-noise code to generate a pseudo-noise code signal;
   the cable modem termination system provides pseudo-noise code synchronization information to each of the plurality of cable modems;
   each of the plurality of cable modems de-spreads the pseudo-noise code signal using the pseudo-noise code to generate its respective pseudo-noise de-spread cable modem user signal;
   each of the plurality of cable modems de-spreads its respective pseudo-noise de-spread cable modem user signal using its respective orthogonal code; and
   each orthogonal code of the plurality of orthogonal codes corresponds to one respective cable modem of the plurality of cable modems.

2. The cable modem system of claim 1, wherein the network access provided to each cable modem within the plurality of cable modems comprises Internet access.

3. The cable modem system of claim 1, further comprising a modulator, communicatively coupled to the cable modem termination system, that modulates the pseudo-noise code signal; and
   the modulated pseudo-noise code signal being transmitted from the cable modem termination system to the at least one cable modem via the cable modem network segment.

4. The cable modem system of claim 1, wherein the cable modem termination system performs transmit equalization of a communication path, between the between the cable modem termination system and the at least one cable modem, within the cable modem network segment.

5. The cable modem system of claim 4, wherein the orthogonal code spreading and the pseudo-noise code spreading operate cooperatively to minimize effects of multi-path across the communication path.

6. A cable modem system that is operable using synchronous code division multiple access for a plurality of cable modem channels, the cable modem system comprising:
   a plurality of cable modems;
   a cable modem termination system; and
   a cable modem network segment that communicatively couples the cable modem termination system to the plurality of cable modems; and wherein:
   the cable modem termination system is operable to provide network access to each cable modem within the plurality of cable modems, the network access being provided using a plurality of cable modem user signals, each cable modem user signal being transmitted from the cable modem termination system to at least one of the cable modems within the plurality of cable modems;
   each of the plurality of cable modems spreads its respective cable modem user signal using its respective orthogonal code of a plurality of orthogonal codes to generate its respective orthogonal code spread cable modem user signal;
   each of the plurality of cable modes spreads its respective orthogonal code spread cable modem user signal using a pseudo-noise code, that is common to all of the plurality of cable modems, to generate a pseudo-noise code spread cable modem user signal;
   the cable modem termination system de-spreads each respective pseudo-noise code spread cable modem user signal using the pseudo-noise code to generate a respective pseudo-noise code de-spread signal;
   the cable modem termination system de-spreads each respective pseudo-noise code de-spread signal using the orthogonal code employed by the respective cable modem to generate the respective orthogonal code de-spread signal; and
   each orthogonal code of the plurality of orthogonal codes corresponds to one respective cable modem of the plurality of cable modems.

7. The cable modem system of claim 6, wherein the network access provided to each cable modem within the plurality of cable modems comprises Internet access.

8. The cable modem system of claim 6, further comprising a modulator, communicatively coupled to the at least one cable modem, that modulates the pseudo-noise code spread cable modem user signal; and
   the modulated pseudo-noise code spread cable modem user signal being transmitted from the at least one cable modem to the cable modem termination system via the cable modem network segment.

9. The cable modem system of claim 6, wherein the at least one cable modem performs transmit equalization of a communication path between the between the at least one cable modem and the cable modem termination system within the cable modem network segment.

10. The cable modem system of claim 9, wherein the orthogonal code spreading and the pseudo-noise code spreading operate cooperatively to minimize effects of multi-path across the communication path.

11. A cable modem, implemented within a cable modem system, that is operable using synchronous code division multiple access, the cable modem comprising:
    a transmit block comprising an orthogonal code spreader and a pseudo-noise spreader; and a receive block comprising a pseudo-noise de-spreader and an orthogonal code de-spreader; and wherein:

the transmit block being operable to spread a cable modem user signal using the orthogonal code spreader to generate an orthogonal code spread cable modem user signal;

the transmit block being operable to spread the orthogonal code spread cable modem user signal using the pseudo-noise code spreader to generate a pseudo-noise code spread cable modem user signal;

the receive block being operable to de-spread a received cable modem user signal using the pseudo-noise code de-spreader to generate an orthogonal code de-spread cable modem user signal;

the receive block being operable to de-spread the orthogonal code de-spread cable modem user signal using the orthogonal code de-spreader;

the orthogonal code spreader and the orthogonal code de-spreader employ a same orthogonal code unique to the cable modem;

each of the pseudo-noise spreader and the pseudo-noise de-spreader employs a same pseudo-noise code employed by all other cable modems within the cable modem system in accordance with spreading respective cable modem user signals and de-spreading respective received pseudo-noise code spread cable modem user signals; and the orthogonal code employed by the orthogonal code spreader and the orthogonal code de-spreader is different than all other orthogonal codes employed by all other cable modems within the cable modem system.

12. The cable modem of claim 11, wherein the transmit block further comprises a modulator and the receive block further comprises a de-modulator;

the modulator modulates the pseudo-noise code spread cable modem user signal before transmission to a cable modem termination system via a cable modem network segment; and the de-modulator de-modulates the received cable modem user signal, the received cable modem user signal being received from the cable modem termination system via the cable modem network segment.

13. The cable modem of claim 11, wherein the cable modem termination system is operable to provide network access to the cable modem.

14. The cable modem of claim 13, wherein the network access comprises Internet access.

15. The cable modem of claim 11, further comprising a front-end filter that is operable to perform ingress cancellation filtering.

16. A cable modem system that is operable using synchronous code division multiple access for a plurality of cable modem channels, comprising:

a plurality of cable modems such that each of the plurality of cable modems includes a respective pseudo-noise de-spreader and a respective orthogonal code de-spreader; and wherein:

each of the plurality of cable modems receives a pseudo-noise code signal;

each of the plurality of cable modems employs its respective pseudo-noise de-spreader, that operates using a pseudo-noise code that is common to all of the plurality of cable modems, to de-spread the pseudo-noise code signal thereby generating its respective pseudo-noise de-spread cable modem user signal;

each of the plurality of cable modems de-spreads its respective pseudo-noise de-spread cable modem user signal using its respective orthogonal code; and each of the plurality of orthogonal codes corresponds to one respective cable modem of the plurality of cable modems.

17. The cable modem system of claim 16, further comprising:

a cable modem termination system coupled to each of the plurality of cable modems via a cable modem network segment; and wherein:

the cable modem termination system transmits the pseudo-noise code signal to each of the plurality of cable modems;

the cable modem termination system includes a cable modem termination system pseudo-noise control module;

each of the of the plurality of cable modems includes a respective cable modem pseudo-noise control module coupled to its respective pseudo-noise de-spreader; and the cable modem termination system pseudo-noise control module provides a control signal to at least one respective cable modem pseudo-noise control module to enable its respective pseudo-noise de-spreader to de-spread the pseudo-noise code signal.

18. The cable modem system of claim 16, wherein:

each of the of the plurality of cable modems includes a respective cable modem pseudo-noise control module;

each of the of the plurality of cable modems includes a respective OR gate coupled to its respective cable modem pseudo-noise control module;

each respective cable modem pseudo-noise control module provides an enable signal and the pseudo-noise code to its respective OR gate; and when permitted by the enable signal provided to its respective OR gate, a respective pseudo-noise de-spreader of a respective cable modem is operative to de-spread the pseudo-noise code signal using the pseudo-noise code to generate its respective pseudo-noise de-spread cable modem user signal.

19. The cable modem system of claim 18, further comprising:

a cable modem termination system coupled to each of the plurality of cable modems via a cable modem network segment; and wherein:

the cable modem termination system transmits the pseudo-noise code signal to each of the plurality of cable modems;

the cable modem termination system includes a cable modem termination system pseudo-noise control module; and the cable modem termination system pseudo-noise control module provides the enable signal to at least one respective cable modem pseudo-noise control module, to at least one respective cable modem pseudo-noise control module to enable its respective pseudo-noise de-spreader to de-spread the pseudo-noise code signal.

20. The cable modem system of claim 19, wherein:

the cable modem termination system pseudo-noise control module also provides pseudo-noise synchronization information to each respective cable modem pseudo-noise control module within each respective cable modem of the plurality of cable modems.

21. A method, comprising:

spreading a first input signal using a first orthogonal code, of a plurality of orthogonal codes, thereby generating a first orthogonal code spread signal;

spreading a second input signal using a second orthogonal code, of the plurality of orthogonal codes, thereby generating a second orthogonal code spread signal;

summing the first orthogonal code spread signal and the second orthogonal code spread signal thereby generating a summed spread signal;

spreading the summed spread signal using a pseudo-noise code thereby generating a pseudo-noise code spread signal;

from a transmitter, transmitting the pseudo-noise code spread signal to a receiver of a plurality of receivers such that each orthogonal code of the plurality of orthogonal codes corresponds to one respective receiver of the plurality of receivers;

within the receiver, de-spreading the pseudo-noise code spread signal using the pseudo-noise code thereby generating a pseudo-noise code de-spread signal; and de-spreading the pseudo-noise code de-spread signal using the first orthogonal code thereby generating an orthogonal code de-spread signal.

22. The method of claim 21, further comprising:
within a first receiver of the plurality of receivers:
    de-spreading the pseudo-noise code spread signal using the pseudo-noise code thereby generating the pseudo-noise code de-spread signal; and
    de-spreading the pseudo-noise code de-spread signal using the first orthogonal code thereby generating the orthogonal code de-spread signal; and
within a second receiver of the plurality of receivers:
    de-spreading the pseudo-noise code spread signal using the pseudo-noise code thereby generating a second pseudo-noise code de-spread signal; and
    de-spreading the second pseudo-noise code de-spread signal using the second orthogonal code thereby generating a second orthogonal code de-spread signal.

23. The method of claim 21, wherein:
the transmitter is a cable modem termination system; and
the plurality of receivers is a plurality of cable modems coupled to the cable modem termination system.

24. The method of claim 21, further comprising:
performing ingress cancellation filtering to the pseudo-noise code spread signal before de-spreading the pseudo-noise code spread signal using the pseudo-noise code.

25. The method of claim 21, further comprising:
providing an enable signal from the receiver to the transmitter; and
within the receiver, employing the enable signal to direct the spreading the summed spread signal using the pseudo-noise code thereby generating the pseudo-noise code spread signal.

26. A method, comprising:
within a transmitter, receiving an enable signal;
spreading a first input signal using a first orthogonal code, of a plurality of orthogonal codes, thereby generating a first orthogonal code spread signal;

spreading a second input signal using a second orthogonal code, of the plurality of orthogonal codes, thereby generating a second orthogonal code spread signal;

summing the first orthogonal code spread signal and the second orthogonal code spread signal thereby generating a summed spread signal;

selectively spreading the summed spread signal, based on the enable signal, using a pseudo-noise code thereby generating a pseudo-noise code spread signal; and from the transmitter, based on the enable signal, transmitting either the pseudo-noise code spread signal or the summed spread signal to a plurality of receivers such that each orthogonal code of the plurality of orthogonal codes corresponds to one respective receiver of the plurality of receivers.

27. The method of claim 26, further comprising:
within a first receiver of the plurality of receivers that receives the summed spread signal, de-spreading the summed spread signal using the first orthogonal code thereby generating a first orthogonal code de-spread signal; and
within a second receiver of the plurality of receivers that receives the summed spread signal, de-spreading the pseudo-noise code spread signal using the second orthogonal code thereby generating a second orthogonal code de-spread signal.

28. The method of claim 26, further comprising:
within a first receiver of the plurality of receivers that receives the pseudo-noise code spread signal:
    de-spreading the pseudo-noise code spread signal using the pseudo-noise code thereby generating a first pseudo-noise code de-spread signal; and
    de-spreading the first pseudo-noise code de-spread signal using the first orthogonal code thereby generating a first orthogonal code de-spread signal; and
within a second receiver of the plurality of receivers that receives the pseudo-noise code spread signal:
    de-spreading the pseudo-noise code spread signal using the pseudo-noise code thereby generating a second pseudo-noise code de-spread signal; and
    de-spreading the second pseudo-noise code de-spread signal using the second orthogonal code thereby generating a second orthogonal code de-spread signal.

29. The method of claim 26, further comprising:
the transmitter is a cable modem termination system; and
the plurality of receivers is a plurality of cable modems coupled to the cable modem termination system.

30. The method of claim 26, further comprising:
within a receiver of the plurality of receivers that receives the pseudo-noise code spread signal, performing ingress cancellation filtering to the pseudo-noise code spread signal before de-spreading the pseudo-noise code spread signal using the pseudo-noise code.

* * * * *

UNITED STATES PATENT AND TRADEMARK OFFICE
CERTIFICATE OF CORRECTION

PATENT NO. : 7,681,214 B2
APPLICATION NO. : 10/079367
DATED : March 16, 2010
INVENTOR(S) : Nabil R. Yousef and Bruce J. Currivan It is certified that error appears in the above-identified patent and that said Letters Patent is hereby corrected as shown below:

Column 14, line 15, in Claim 17: replace "each of the of the plurality of cable modems" with -- each of the plurality of cable modems --.

Column 14, line 24, in Claim 18: replace "each of the of the plurality of cable modems" with -- each of the plurality of cable modems --.

Column 14, line 26, in Claim 18: replace "each of the of the plurality of cable modems" with -- each of the plurality of cable modems --.

Signed and Sealed this
Second Day of August, 2011

David J. Kappos
*Director of the United States Patent and Trademark Office*